US006341501B2

(12) United States Patent
Sugimoto et al.

(10) Patent No.: US 6,341,501 B2
(45) **Date of Patent: *Jan. 29, 2002**

(54) METHOD OF PRODUCING A SPARK PLUG

(75) Inventors: Makoto Sugimoto; Yutaka Tanaka, both of Nagoya (JP)

(73) Assignee: NGK Spark Plug Co., Ltd., Nagoya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/927,196

(22) Filed: Sep. 11, 1997

(30) Foreign Application Priority Data

Sep. 12, 1996 (JP) ............................................ 8-241503
Aug. 29, 1997 (JP) ............................................ 9-233714

(51) Int. Cl.[7] .......................... C03C 27/02; C03C 27/04
(52) U.S. Cl. ....................... 65/32.2; 65/59.31; 65/59.35
(58) Field of Search ................................ 65/32.1, 32.2, 65/59.31, 59.35

(56) References Cited

U.S. PATENT DOCUMENTS

| | | | | | |
|---|---|---|---|---|---|
| 732,812 | A | * | 7/1903 | Anderson | 403/270 |
| 1,525,453 | A | * | 2/1925 | Littleton | 65/49 |
| 1,848,312 | A | * | 3/1932 | Bruzzone | 65/42 |
| 2,106,578 | A | * | 1/1938 | Schwartzwalder et al. | 403/28 |
| 2,267,571 | A | * | 12/1941 | McDougal | 123/169 EL |
| 2,301,686 | A | * | 11/1942 | Doran | 174/152 S |
| 2,317,305 | A | * | 4/1943 | Schwartzwalder et al. | 174/84 R |
| 2,351,128 | A | * | 6/1944 | Jeffery | 65/59.32 |
| 2,367,445 | A | * | 1/1945 | Stoltenberg | 313/145 |
| 2,906,907 | A | * | 9/1959 | Peras | 313/131 A |
| 3,235,655 | A | | 2/1966 | Counts et al. | 313/144 X |
| 3,370,874 | A | * | 2/1968 | Scherer et al. | 403/28 |
| 3,408,524 | A | | 10/1968 | Blum et al. | 313/145 |
| 3,615,324 | A | * | 10/1971 | Gordon | 65/36 |
| 4,112,330 | A | * | 9/1978 | Stimson et al. | 315/46 |
| 4,414,483 | A | * | 11/1983 | Nishio et al. | 313/136 |
| 4,482,475 | A | | 11/1984 | Sakai et al. | 252/506 |
| 4,622,084 | A | * | 11/1986 | Chang et al. | 156/89.16 |
| 4,915,719 | A | * | 4/1990 | Saffari | 65/32.2 |
| 5,008,584 | A | | 4/1991 | Atsumi et al. | 313/144 X |
| 5,204,579 | A | | 4/1993 | Oshima et al. | 313/144 X |
| 5,477,104 | A | | 12/1995 | Tanabe et al. | 313/144 X |
| 5,563,468 | A | | 10/1996 | Abe et al. | 313/144 X |
| 5,565,730 | A | | 10/1996 | Pollner et al. | 313/144 X |

FOREIGN PATENT DOCUMENTS

| | | |
|---|---|---|
| JP | 7-106050 | 4/1995 |

* cited by examiner

*Primary Examiner*—Sean Vincent
(74) *Attorney, Agent, or Firm*—Morgan, Lewis & Bockius LLP

(57) ABSTRACT

In a spark plug in which a space between a center electrode at the top end side and a terminal electrode at a rear end side which are arranged to be opposite to each other in an axial hole of an insulator, the glass seal is effected at a temperature within the range of 500 to 1000° C. and under a condition where the concentration of oxygen is 4–12 vol %.

13 Claims, 4 Drawing Sheets

METHOD OF PRODUCING A SPARK PLUG

BACKGROUND OF THE INVENTION

1. Field of the Invention

The present invention relates to a spark plug of a type that is to be mounted on an internal combustion engine, and a producing method thereof.

2. Description of the Related Art

A glass sealable spark plug is conventionally known and it is manufactured by a process comprising the steps of: filling a seal glass material or a combination of seal glass material, a resistive material and seal glass material as a glass sealing material within a space between a center electrode at a top end thereof and a terminal electrode at a rear end thereof which are arranged in a axial hole of an insulator; melting the glass of the glass sealing material by heating; pressing the terminal electrode; and cooling them to solidify.

(A) When glass sealing is effected at a comparatively low temperature using glass sealing materials of low softening point, the energy cost is reduced and yet high operating efficiency is provided.

On the other hand, if the sealed portions (i.e., the top end of the terminal electrode and the rear end portion of the center electrode) are exposed to high temperature, the glass sealing materials will soften and both the terminal and center electrodes will loosen to impair the airtightness of the spark plug.

In addition, the binding force of the electrically conductive substance mixed in the sealing materials and the resistive material drops to produce a higher resistance.

(B) When glass sealing is effected at high temperature exceeding 800° C. using glass sealing materials of high softening point exceeding 750° C., the terminal electrode having a plate of nickel or zinc applied to a low carbon steel is oxidized to corrode in the process of glass sealing.

If the terminal electrode is oxidized to corrode, the plate will come off the steel to cause rust formation on the latter.

If rust forms, the electrical connection of the terminal electrode to the plug cap will deteriorate. In addition, the rust stains the barrel portion of the insulator to cause flashover.

SUMMARY OF THE INVENTION

It is an object of the invention to provide a spark plug that can be produced without causing oxidation and corrosion of the terminal electrode during glass sealing and which is protected against the increase in the resistance between the terminal and center electrodes.

A spark plug according to the present invention is comprised of an insulator having an axial hole; a center electrode provided at the top end side of the spark plug; a terminal electrode provided at the rear end side thereof, the center electrode and the terminal electrode being arranged to be opposite to each other in the axial hole; and seal glass filled in the axial hole between the center electrode and the terminal electrode; wherein glass sealing of the seal glass is effected at a temperature in the range of 500 to 1000° C. at an oxygen concentration of not more than 12 vol %.

DETAILED DESCRIPTION OF THE INVENTION

Figure 1:
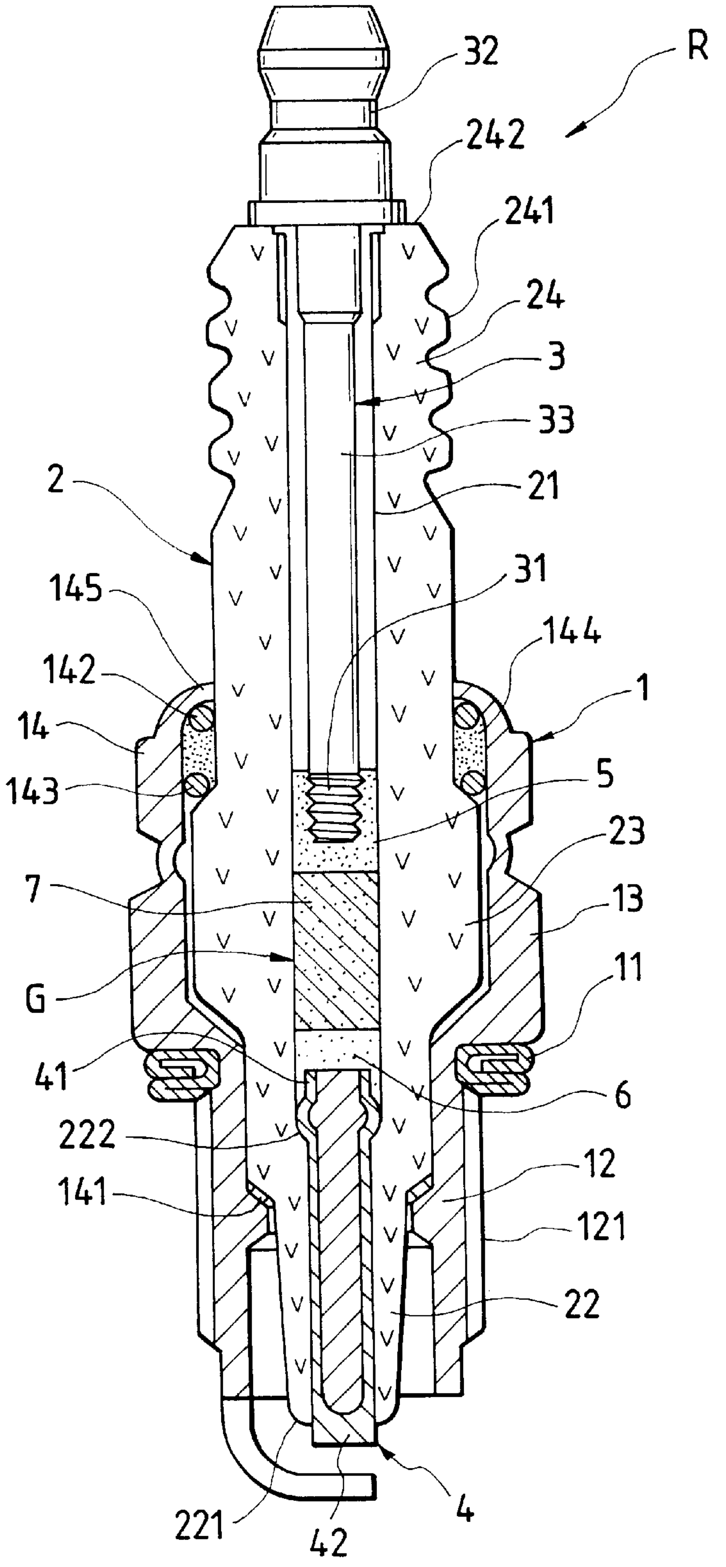
FIG. 1 is a sectional view of the spark plug having a resistor therein using the resistive material composition according to the present invention.

Detailed description of the present invention will be described as follows.

In a spark plug of the present invention in which a center electrode at the top end side thereof and a terminal electrode at the rear end side thereof which are arranged to be opposite each other in an axial hole of an insulator, a space between the center electrode and the terminal electrode is glass-sealed; the glass sealing is effected in a temperature range of 500 to 1,000° C. at an oxygen concentration of not more than 12 vol %.

In the spark plug of the present invention, it is preferable that the plating layer of the terminal portion of the terminal electrode is not rusted for not less than 70 hours in neutral brine spray test.

The spark plug of the present invention may have a cylindrical metallic shell having a projecting ground electrode disposed on its top end face; an insulator with an axial hole that is fixed within the metallic shell; the center electrode arranged at the top end side which is divided by a step seat of the axial hole, a base portion of the center electrode fitting to the step seat; the terminal electrode arranged at the rear end side, having a terminal portion at rear end which protrudes from the end surface of the insulation glass; and seal glass which seals a space between the center electrode and the terminal electrode.

In the spark plug of the present invention, it is preferable that the space between both electrodes is filled with the seal glass, the resistor and the seal glass in this order and the glass sealing is effected in a temperature in the range of 800 to 1000° C.

In the spark plug of the present invention, preferably, the glass sealing is effected, by using glass having softening point of not less than 450° C., at a temperature 50 to 150° C. higher than the softening point.

In the spark plug of the present invention, the terminal electrode is preferably composed of a low carbon steel plated with nickel or zinc.

In the spark plug of the present invention, the glass sealing is effected in either an electric furnace having an inert gas atmosphere or a gas furnace having a reducing gas atmosphere, either of said atmospheres having an oxygen concentration of not more than 12 vol %.

If the glass sealing is effected at less than 500° C., the seal glass is softened during operating the combustion engine, because a seal glass having low softening temperature is used. On the other hand, if the glass sealing is effected at more than 1000° C., the terminal electrode is oxidized and corroded at the time of glass sealing and it is made difficult to prepare the seal glass suitable for such a high temperature glass sealing.

In the present invention, glass sealing is effected under the atmosphere in which the temperature of the glass sealing portion is within the range of 500 to 1000° C. as well as the oxygen concentration is not more than 12 vol. %. Accordingly, it is possible to suppress the oxidation and corrosion of the terminal portion of the terminal electrode. In addition, the plating layer of the terminal portion of said terminal electrode is not rusted for not less than 70 hours in neutral brine spray test.

In the spark plug in which a space between the center electrode and the terminal electrode in the axial hole of the insulator is glass-sealed by the seal glass, resistor and seal glass, the glass sealing is effected at a high temperature of 800 to 1000° C. and under the condition that the concentration of oxygen is not more than 12 vol. %. Accordingly, the plating layer of the terminal portion of the terminal electrode is not oxidized and is not corrode.

Since the seal glasses do not soften, neither the terminal electrode nor the center electrode will loosen and, hence, the airtightness of the spark plug is not impaired. In addition, the binding force of the electrically conductive substance mixed in the seal glasses and the resistor will not drop and, hence, the resistance between the terminal and center electrodes will not increase.

If glass sealing is effected at less than 800° C., the resistor glass does not soften sufficiently. Therefore, it is easy to be quenching-shrunk and a conductive path is cut by spark energy, thereby increasing resistance value. On the other hand, if glass sealing is effected at more than 1000° C., the terminal electrode may be oxidized or corroded during glass sealing and it is made difficult to prepare seal glass suitable for such a high temperature glass sealing.

If the softening point is not less than 450° C. and the glass sealing is effected at the temperature 50 to 150° C. higher than the softening point, the seal glass sufficiently melts, thereby ensuring glass sealing. In addition, even if the temperature of the glass sealing portion increases (300 to 330° C.), the sealing portion is not softened and the terminal electrode is not loosen, thereby not impairing the airtightness.

A low carbon steel on which nickel or zinc is plated is used as the terminal electrode of a spark plug.

When glass sealing is effected in air at high temperature not less than 500° C., the terminal electrode is oxidized to corrode.

However, when the concentration of oxygen is not more than 12 vol. %, the terminal electrode is not oxidized to corrode during glass sealing. Particularly, the nickel plating is preferable.

If the oxygen concentration is not more than 12 vol. %, said glass sealing can be effected in either an electric furnace having an inert gas atmosphere or a gas surface having a reducing gas atmosphere, and the plating layer of the terminal portion of the terminal electrode is not oxidized to corrode during glass sealing.

The present invention will be described more detail in the following embodiments.

Spark plug R having the design features according to the present invention will now be described with reference to FIG. 1.

As FIG. 1 shows, spark plug R includes a cylindrical metallic shell 1, insulator 2 with an axial through-hole 21 that is fixed within the metallic shell 1, a terminal electrode 3 inserted into the axial hole 21, a center electrode 4 fixed within the axial hole 21 such that its distal end portion protrudes from the top end face 221 of the insulator 2, seal glasses 5 and 6 which seal the seal portion 31 of the terminal electrode 3 and the base portion 41 of the center electrode 4, respectively, within the axial hole 21, and a resistor 7 positioned between the seal glasses 5 and 6. The spark plug R having this construction is threaded onto the cylinder head (not shown) of an internal combustion engine via a gasket 11 and the plug cap (not shown) is fitted over the terminal portion 32 for supply of high voltage.

The metallic shell 1 is formed of a low carbon steel and consists of a screw portion 12 having a male thread 121 formed on the outer circumference, a barrel portion 13 having the gasket 11 disposed on the front side, and a hexagonal portion 14 which is to be gripped with a plug wrench. Shown by 141 is a packing, 142 and 143 are each a ring, and 144 is talc.

The insulator 2 consists of a insulator nose portion 22 that is formed of an alumina based ceramic sinter and which is positioned inside of the screw portion 12, a large-diameter portion 23 positioned inside of the metallic shell 1 in an area extending from the hexagonal portion 14 to the barrel portion 13, and a head portion 24 having a corrugation 241 formed on the outer circumference. The axial hole 21 is formed through the insulator 2 along its axis. That part of the axial hole 21 which is positioned in an area extending form the head portion 24 to the large-diameter portion 23 is formed in a large diameter (4.5ϕ) and that part of the axial hole 21 which is positioned in an area corresponding to the insulator nose portion 22 has a slightly larger diameter than the center electrode (of which the diameter is 2.6ϕ).

The terminal electrode 3 is constituted by a low carbon steel (C: not more than 0.3%) plated with nickel (in a thickness of 5 μm) and it consists of a seal portion 31 that is glass sealed within the axial hole 21 of the insulator 2, a terminal portion 32 projecting from the end face 242 of the head portion of the insulator 2 and a rod-shaped portion 33 which connects the terminal portion 32 and the seal portion 31.

The terminal portion 32 has a smaller diameter in the center than in the other parts in order to ensure that the plug cap (not shown) will not slip out after it has been fitted over the terminal portion 32.

The seal portion 31 is threaded or knurled on the outer circumference and sealed within the axial hole 21 of the insulator 2 by means of the seal glass 5.

The center electrode 4 is composed of a sheath member made of a nickel alloy and a core member made of a good heat conductor metal such as copper that is embedded in said sheath member. Having this structure, the center electrode 4 is fitted into the axial hole 21 of the insulator 2 such that its distal end portion 42 projects from the top end face 221 of the insulator 2, with the base portion 41 being fitted to a step seat 222 and sealed within the axial hole 21 via the seal glass 6.

The seal glasses 5 and 6 have electrical conductivity since they are prepared by melting and solidifying a conductive glass powder which is a 1:1 mixture of a copper powder and a calcium borosilicate glass powder having the softening point of 780° C. The center electrode 4 is electrically connected to the terminal electrode 3 via the seal glass 6, resistor 7 and seal glass 5 in this order.

The resistor 7 which should have a resistance of 5 kΩ is prepared by the following procedure. 17.3 wt % of $ZrO_2$ powder, 0.2 wt % of alumina powder, 2.0 wt % of carbon black, 80 wt % of glass powder (containing 50 wt % of $SiO_2$, 29 wt % of $B_2O_3$, 4 wt % of $Li_2O$ and 17 wt % of BaO: Softening point: 820° C.) and 0.5 wt % of PVA (polyvinyl alcohol) binder are mixed by a mixer to prepare the resistor 7.

Sealing materials to provide the seal glasses 5 and 6 are prepared in the following manner.

To 50 parts by weight of a calcium borosilicate glass powder, 50 parts by weight of a metallic copper powder and one part by weight of a binder PVA are added, and the respective ingredients are mixed thoroughly with a mixer. The mixture is dried at 100° C. to form the seal glass material.

Next, the glass sealing process of the spark plug R having resistor as shown in FIG. 1 will be described referring to FIGS. 2A to 3B.

Figure 2A:
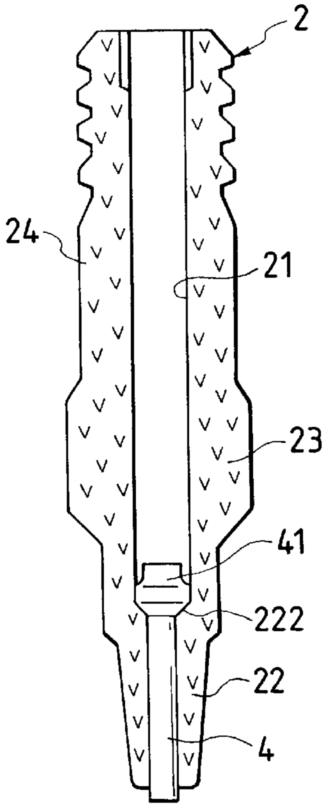
FIGS. 2A, 2B, and 2C are an explanation view of the glass sealing process of the center electrode and the terminal electrode into the axial hole of the insulator according to the present invention.

I) As shown in FIG. 2A, the center electrode 4 is inserted from the upper into the axial hole 21 of the insulator 2 which is formed by applying and baking a glaze on the surface of the heat portion 24 of a sintered body mainly composed of alumina, so that the base portion 41 having large diameter is fitted to the step seat 222.

Figure 2B:
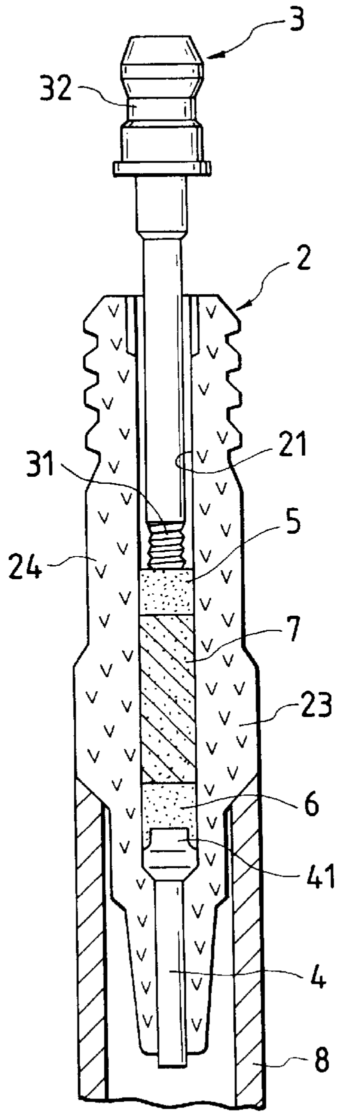

II) As shown in FIG. 2B, 0.3g of the seal glass material 6 using the above described calcium borosilicate glass powder (softening temperature: 780° C., $G_2$ glass) is filled in the axial hole 21, and the seal glass material 6 is pressed under the pressure of 140 MPa.

On the seal glass material 6, 0.3 g of the resistor 7 is filled in the axial hole 21 and pressed under the pressure of 140 MPa. After the pressing, on the resistor 7, once 0.3 g of the resistor 7 is filled in the axial hole 21 and also pressed under the pressure of 140 MPa, so that 0.6 g of the resistor 7 is filled in the axial hole 21 on the seal glass material 6.

Moreover, 0.3 g of the seal glass material 5 is filled in the axial hole 21 on the resistor 7 and pressed under the pressure of 140 MPa. Thereafter, the terminal electrode 3 is inserted in the axial hole 21.

III) Next, the insulator 2 into which the terminal electrode 3 is inserted is inserted into a cylindrical receiving base 8 as shown in FIG. 2B made of alumina ceramic so as to fit the seat face of the large diameter portion 23, and is disposed in a furnace 9 which the fuel is LNG. Part of the seal glass portion of the large diameter portion 23 and the heat portion 24 is heated at 800 to 1000° C. for about 20 min. to melt the glass of the seal glass materials 5, 6 and resistor 7 (glass seal portion G). Then, the terminal electrode 3 is pressed under the load of 100 Kg, and the load force is maintained in 20 Kg until 700° C. Thereafter, the insulator 2 is cooled to room temperature.

Figure 2C:
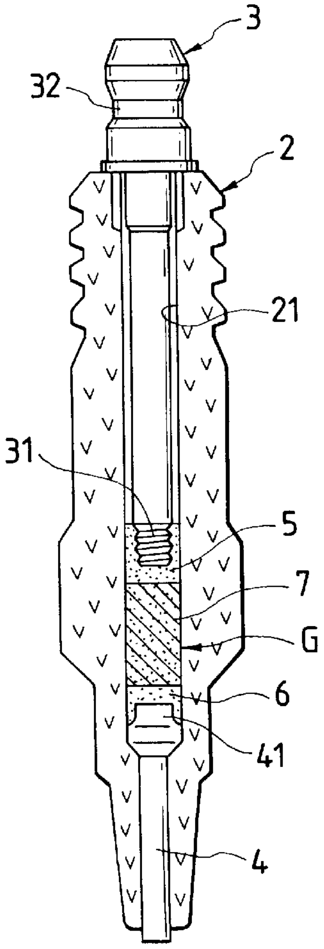

Then, as shown in FIG. 2C, the seal portion 31 of the terminal electrode 3 and the base portion 41 of the center electrode 4 is fixed in the axial hole 21, thereby finishing the glass sealing process.

Figure 3B:
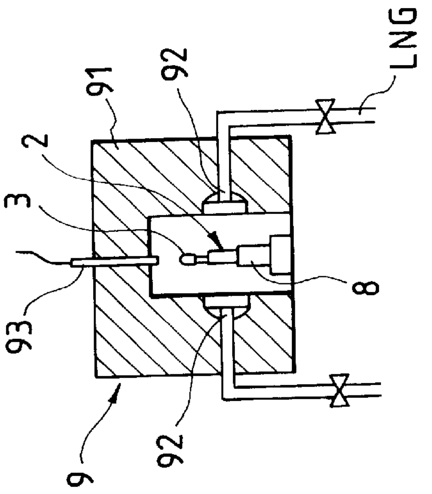
FIG. 3B is a sectional view of A—A line.
Figure 3A:
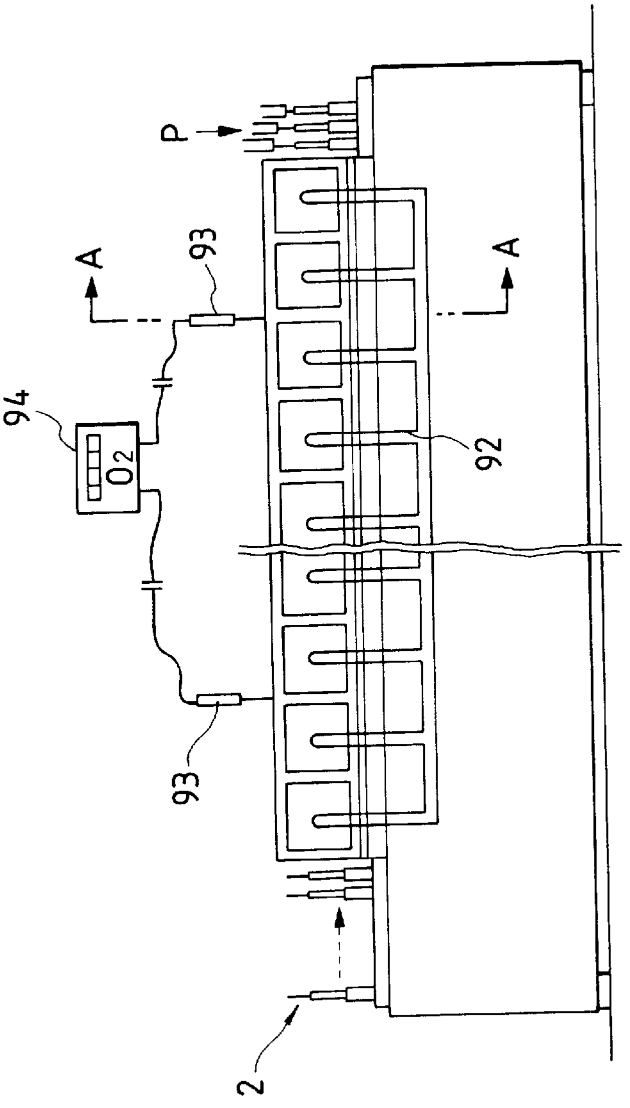
FIG. 3A is a schematic view of the gas furnace used in the glass sealing in the present invention.

Incidentally, in FIGS. 3A and 3B, reference numeral 91 designates a furnace having fire resistance; 92, a burner device; and 93, oxygen sensor for detecting oxygen concentration. Two oxygen sensor 93 are used so that a controller 94 controls the oxygen concentration to be less than 12 vol. % (preferably 0.1 to 12 vol. %). The temperature is controlled by adjusting the flowing gas amount of LNG of the burner device 92 to be in constant. Accordingly, it is possible to prevent the oxidation and the corrosion of the plating layer (nickel plating: thickness of 5 $\mu$m) of the terminal portion 32 of the terminal electrode 3.

The insulator 2 which the glaze is previously applied and baked on the head portion 24, etc. in this embodiment. However, it is possible to use non-baked insulator 2 which the glaze is merely applied to the head portion 24, and the glaze is baked thereon during the glass sealing process. In this case, it is possible to save cost because the baking is made only one time.

The insulator 2 which the glass sealing is finished is fitted in the metallic shell 1 via the packing 141, and the rings 142, 143, the talc 144 is also inserted therein, and the caulking portion 145 is caulked so that the insulator 2 is assembled to the metallic shell 1.

Figure 4:
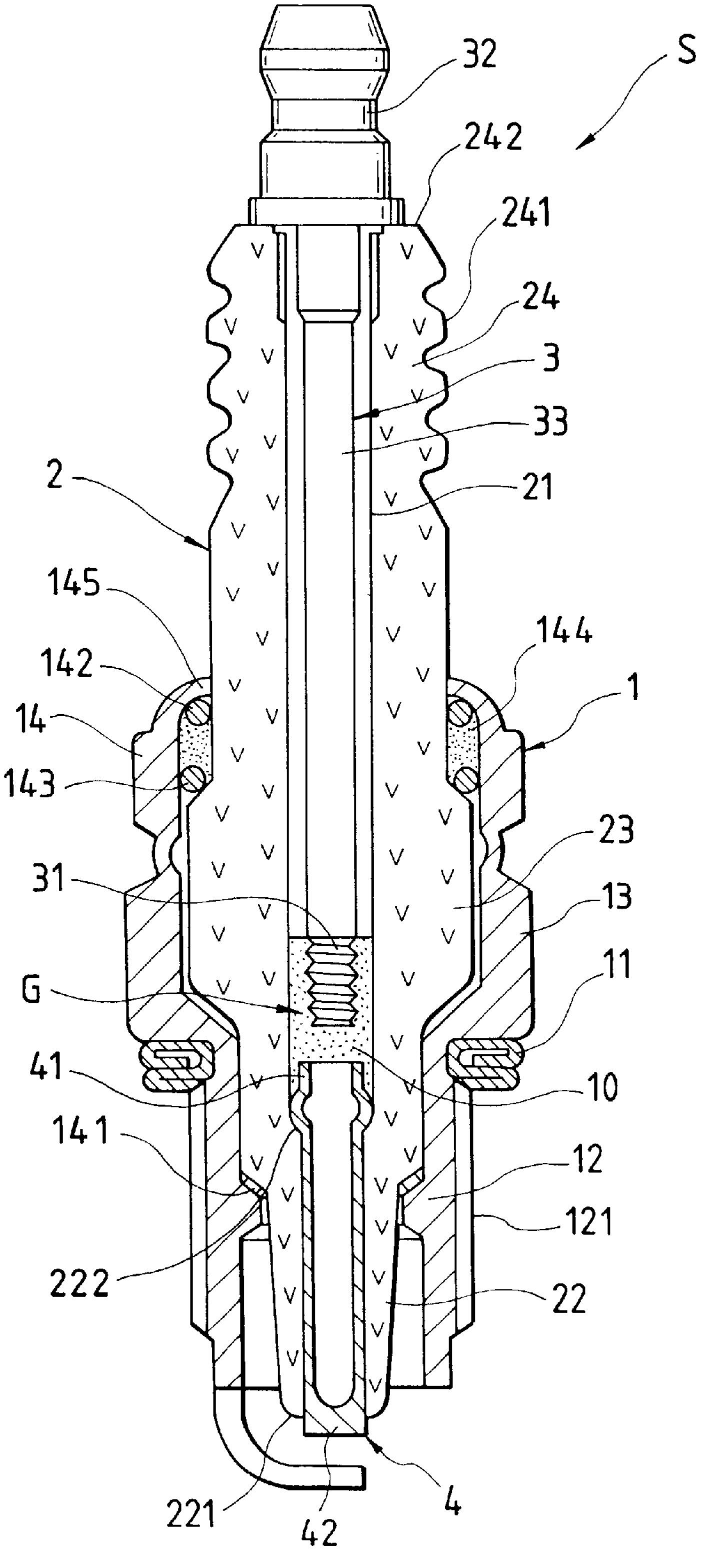
FIG. 4 is a sectional view of the spark plug without the resistive body.

FIG. 4 shows a spark plug S of another embodiment according to the present invention.

This spark plug S does not have the resistor 7 of the spark plug R of the above embodiment, in which a space between the center electrode 4 and the terminal electrode 3 provided to be opposite to each other in the axial hole 21 of the insulator 2 is filled with and sealed by the seal glass 10 at the glass sealing temperature of 500 to 1000° C.

The seal glass material 10 is a mixture of copper powder and glass powder, and the softening temperature of the glass is a wide range of 450 to 950° C. For example, the seal glass material 5, 6 in the above embodiment and the $G_1$ glass described later is used as the seal glass material 10 in the present embodiment, and the oxygen concentration is controlled to be not more than 12 vol. %. Therefore, it is possible to effectively prevent from oxidizing and corroding the nickel plating layer of the terminal portion 32 and the terminal electrode 3.

EXAMPLES

Examples are shown in Table 1. In Table 1, two types of spark plugs are used, namely, the spark plug R having the resistor 7 and the spark plug S having no resistor are used. Estimations were made with respect to used seal glass, glass seal temperature, atmosphere of the furnace, oxygen concentration, rust generation time (Hr) on the surface of the terminal portion 32 of the terminal electrode 3, and the variation ratio (%) of the resistance value.

TABLE 1

| A | B | C | D | E | F | G | H | I | J |
|---|---|---|---|---|---|---|---|---|---|
| 1 | R | G2 | 880 | 100 | AIR | ELECTRIC | *19.8 | 48 | +35 |
| 2 | R | G2 | 890 | 110 | $N_2$ | ELECTRIC | 4.0 | 86 | −21 |
| 3 | R | G2 | 920 | 140 | — | LPG GAS | 8.5 | 72 | −13 |
| 4 | R | G2 | 890 | 110 | — | LPG GAS | 12.0 | 90 | −25 |
| 5 | R | G2 | 900 | 120 | — | LPG GAS | *13.0 | 58 | −16 |
| 6 | S | G1 | 550 | 90 | AIR | ELECTRIC | *20.0 | 68 | +15 |
| 7 | S | G1 | 550 | 90 | $N_2$ | ELECTRIC | 5.0 | 75 | −15 |
| 8 | S | G2 | *480 | 50 | AIR | ELECTRIC | 20.5 | 98 | +55 |
| 9 | S | G2 | 600 | *170 | $N_2$ | ELECTRIC | 2.0 | 88 | +200 |
| 10 | R | G2 | 950 | *170 | $N_2$ | ELECTRIC | 2.5 | 80 | +75 |
| 11 | R | G2 | 810 | *30 | — | LNG GAS | 7.5 | 98 | # |
| 12 | S | G1 | 600 | 140 | — | LNG GAS | 6.8 | 88 | −11 |
| 13 | S | G2 | 830 | 50 | — | LNG GAS | 8.5 | 90 | −5 |
| 14 | R | G2 | 830 | 50 | — | LNG GAS | 8.0 | 90 | −21 |
| 15 | S | G1 | 510 | 50 | — | LNG GAS | 7.5 | 92 | −20 |
| 16 | S | G1 | 880 | 100 | AIR | ELECTRIC | *20.5 | 50 | −10 |

*: out of range of the present invention.
#: glass sealing is impossible.
A) Sample No.
B) Spark plug type (R or S)
C) Used seal glass (G1 or G2)
D) Glass sealing temperature
E) Difference between glass sealing temperature and glass softening point
F) Atmosphere
G) Type of furnace
H) Oxygen concentration (vol %)
I) Rust generation time (hours)
J) Variation ratio of resistance value (%)

The glass compositions (wt %) of the seal glass materials G1, G2 and G3 used in the test were: G1 contained 33% of $SiO_2$, 10% of $B_2O_2$, 6% of $Na_2O$ and 51% of PbO and had the softening point of 460° C.; G2 contained 55% of $SiO_2$, 30% of $B_2O_2$, 5% of $Na_2O$, 5% of PbO and 5% of CaO and had the softening point of 780° C.; and G3 contained 28% of $SiO_2$, 12% of $B_2O_2$, 5% of $Na_2O$ and 55% of PbO and had the softening point of 430° C.

The variation ratio of resistance value (%) is measured in a manner that the spark plugs R, S was mounted on 4-cycle, 4-valve engine, and endurance tests were conducted under a condition of 5000 rpm X full-throttle. The results are exhibited as the difference ratio (%) between the resistance value before the test and that after the test. Then, plus (+) designates an increase of the resistance value, and minus (−) designates an decrease of the resistance value. As the judgement standard of the resistance value variation ratio, the range within ±30% of the resistance value load life test defined by JIS B8031 was defined as good.

Further, the rust generation time (hours) of the surface of the terminal portion 32 of the terminal electrode 3 was measured based on the neutral brine spray test method defined by JIS H8502. As the judgement of the rust generation time, the time of not less than 70 hours was defined as good.

Next, advantages of the spark plugs produced based on the conditions of samples in the tests according to the present invention.

(a) The spark plugs R produced based on the conditions of sample Nos. 2, 3, 4 and 14 (corresponding to claims 1, 2, 4, 5, 6 and 7) can prevent to oxidize and corrode the surface of the terminal portion 32 of the terminal electrode 3.

The spark plugs S produced based on the conditions of sample Nos. 7, 12, 13 and 15 (corresponding to claims 1, 2, 3, 5, 6 and 7) also can prevent to oxidize and corrode the surface of the terminal portion 32 of the terminal electrode 3.

Accordingly, since the plating of the terminal electrode 3 does not peel off, rust caused by peeling the plating does not generate. Accordingly, deficiencies such as a connection inferior with a plug cap caused by the rust generation and a flush over do not occur.

(b) The spark plugs R produced based on the conditions of sample Nos. 2, 3, 4 and 14 are free from softening the seal glass materials 5, 6 even if the seal portion (seal portion 31 and base portion 41) is exposed to high temperature during normal use.

Accordingly, the terminal electrode 3 and the center electrode 4 are not loosen, i.e, the airtightness can be maintained. In addition, since it is possible to suppress to lower the coupling force of copper contained in the seal glass materials 5, 6, the resistance value (5 kΩ) between the terminal electrode 3 and the center electrode 4 is not extremely increased.

Further, the spark plugs produced based on the conditions of sample Nos. 7, 12, 13 and 15 are free from softening the seal glass material 10 even if the seal portion is exposed to high temperature.

Therefore, the terminal electrode 3 and the center electrode 4 are not loosen.

Incidentally, the spark plug S of the sample No. 8 which the glass sealing temperature is not more than 500° C. decreases the resistance value during the engine test.

In addition, like as the sample No. 11, if the glass sealing temperature is not 50° C. or more higher than the softening point (780° C.), the glass sealing is not possible. Further, like as the sample Nos. 9, 10, if the glass sealing temperature is 150° C. or more higher than the softening point, the conductive material (copper powder) and glass become in disorder. Consequently, the resistance value varies widely, and the resistance value variation ratio after the engine test is extremely larger than +30%, thereby being not preferable.

In the electric furnace capable of flowing an inert gas (sample Nos. 2, 7) and the gas furnace the fuel of which is LPG or LNG (sample No. 3, 4, 12, 13, 14 and 15), since the oxygen concentration is made 12 vol % or less, the oxidation and the corrosion of the surface of the terminal portion 32 of the terminal electrode 3 can be effectively suppressed.

The present invention include the following examples in addition to the above examples.

(a) Seal glass raw material may be barium borate glass, lithium borate-calcium glass.

(b) The terminal electrode 3 may be a zinc plated low carbon steel (chromete treatment).

(c) The seal glass 5, 6 may be a known seal glass which includes a metal oxide and a metal carbide such as $TiO_2$, TiC, $B_4C$ and the like in addition to the glass powder and the metal powder such as copper in the above examples.

(d) As the resistor 7, various known glass resistive material can be used in addition to the above examples.

What is claimed is:

1. A method for producing a spark plug, comprising the steps of:

inserting a center electrode from an upper end of an insulator through an axial hole of the insulator;

inserting a seal glass member through the axial hole on top of the center electrode; and inserting a terminal electrode through the axial hole on top of the seal glass member, wherein a space between the center electrode provided at a top end side and the terminal electrode provided at a rear end side is glass-sealed at a temperature of 500 to 1000° C. at an oxygen concentration in the range of 4 to 12 vol % and the glass sealing is effected by glass having a softening point of not less than approximately 450° C. at a temperature approximately 50 to 150° C. higher than the softening point.

2. The method for producing a spark plug according to claim 1, wherein the glass sealing is effected at a temperature of 800 to 1000° C.

3. A method for producing a spark plug, comprising the steps of:

inserting a center electrode from an upper end of an insulator through an axial hole of the insulator;

inserting seal glass material with a softening temperature between approximately 700 to 850° C. from the upper end into the axial hole of the insulator and pressing the seal glass material against the center electrode under a pressure;

inserting a resistor from the upper end into the axial hole of the insulator and pressing the resistor against the seal glass material under a pressure;

inserting a terminal electrode from the upper end into the axial hole of the insulator;

heating the seal glass portion in an oxygen concentration in the range of 4 to 12 vol % at a temperature of 50 to 150° C. higher than the softening temperature of the seal glass material until glass from the seal glass material melts with the resistor;

pressing the terminal electrode against the resistor and seal glass material under a pressure; and cooling the insulator to room temperature.

4. A method for producing a spark plug, comprising the steps of:

inserting a center electrode from an upper end of an insulator through an axial hole of the insulator;

inserting seal glass material having a mixture of copper powder and glass powder with a softening temperature between approximately 450 to 950° C. from the upper end into the axial hole of the insulator and pressing the seal glass material against the center electrode under a pressure;

inserting a terminal electrode from the upper end into the axial hole of the insulator;

heating the seal glass material in an oxygen concentration in the range of 4 to 12 vol % at a temperature of 50 to 150° C. higher than the softening temperature of the seal glass material;

pressing the terminal electrode against the seal glass material under a pressure; and cooling the insulator to room temperature.

5. The method of producing a spark plug according to claim 1, wherein said seal glass member comprises at least one of metal and carbon.

6. The method of producing a spark plug according to claim 3, wherein said seal glass material comprises carbon.

7. The method of producing a spark plug according to claim 4, wherein said seal glass material comprises metal or carbon.

8. The method of producing a spark plug according to claim 1, wherein said terminal electrode has nickel plating, and said center electrode has a sheath member made of a nickel alloy.

9. The method of producing a spark plug according to claim 3, wherein said terminal electrode has nickel plating, and said center electrode has a sheath member made of a nickel alloy.

10. The method of producing a spark plug according to claim 4, wherein said terminal electrode has nickel plating, and said center electrode has a sheath member made of a nickel alloy.

11. The method for producing a spark plug according to claim 1, wherein said seal glass member contains at least one of barium borate glass or lithium borate-calcium glass.

12. The method for producing a spark plug according to claim 1, wherein said seal glass member comprises at least one of a metal oxide and a metal carbide.

13. A method for producing a spark plug, said spark plug comprising an insulator having an axial hole;

a center electrode provided at a top end side of said spark plug;

a terminal electrode provided at a rear end side of said spark plug, said terminal electrode including a low carbon steel plated with nickel or zinc, said center electrode and said terminal electrode being arranged to be opposite to each other in the axial hole; and seal glass filled in said axial hole between said center electrode and said terminal electrode, said method comprising the steps of:

solidifying said seal glass at a temperature in a range of 500 to 1000° C. at an oxygen concentration in the range of 4 to 12 vol % thereby preventing oxidation and corrosion of said terminal electrode and preventing increase of a resistance between the terminal electrode and the center electrode.

* * * * *